United States Patent
Khojastepour et al.

(10) Patent No.: US 11,441,890 B2
(45) Date of Patent: Sep. 13, 2022

(54) LINEAR-GRAMMETRY AND CALIBRATION BY SIMULTANEOUS MULTILATERATION USING ONLY EDGE DISTANCE ESTIMATES THROUGH TWO-WAY RANGING

(71) Applicant: NEC Laboratories America, Inc., Princeton, NJ (US)

(72) Inventors: Mohammad Khojastepour, Lawrenceville, NJ (US); Sampath Rangarajan, Bridgewater, NJ (US)

(73) Assignee: NEC Corporation

(*) Notice: Subject to any disclaimer, the term of this patent is extended or adjusted under 35 U.S.C. 154(b) by 73 days.

(21) Appl. No.: 17/026,139

(22) Filed: Sep. 18, 2020

(65) Prior Publication Data

US 2021/0088323 A1 Mar. 25, 2021

Related U.S. Application Data

(60) Provisional application No. 62/903,015, filed on Sep. 20, 2019.

(51) Int. Cl.
| | |
|---|---|
| *G01B 11/00* | (2006.01) |
| *G01B 11/14* | (2006.01) |
| *G01S 5/02* | (2010.01) |

(52) U.S. Cl.
CPC ............ *G01B 11/002* (2013.01); *G01B 11/14* (2013.01); *G01S 5/0289* (2013.01)

(58) Field of Classification Search
CPC ..... G01S 5/0289; G01B 11/002; G01B 11/14; G06T 7/60; G06T 7/73
See application file for complete search history.

(56) References Cited

U.S. PATENT DOCUMENTS

| | | | | |
|---|---|---|---|---|
| 8,340,818 | B2 * | 12/2012 | Pitzer | G06N 7/005 700/250 |
| 9,154,964 | B2 * | 10/2015 | Potkonjak | H04W 16/20 |
| 9,980,097 | B2 * | 5/2018 | Narasimha | H04W 64/00 |
| 10,951,434 | B2 * | 3/2021 | McQueen | H05B 47/175 |
| 11,100,300 | B2 * | 8/2021 | Plummer | G06K 7/1413 |
| 2018/0270933 | A1 * | 9/2018 | Hu | H04L 41/12 |
| 2020/0053689 | A1 * | 2/2020 | McQueen | H04W 4/023 |
| 2020/0064435 | A1 * | 2/2020 | Douglas | H04W 4/021 |
| 2020/0209340 | A1 * | 7/2020 | Ylamurto | H04W 24/10 |
| 2020/0326179 | A1 * | 10/2020 | Tong | G06V 20/58 |
| 2021/0081735 | A1 * | 3/2021 | Van Dijk | G06K 19/06 |
| 2021/0364593 | A1 * | 11/2021 | Fellhauer | G01S 5/10 |
| 2022/0003555 | A1 * | 1/2022 | Colburn | H04N 5/23238 |

* cited by examiner

*Primary Examiner* — Khawar Iqbal
(74) *Attorney, Agent, or Firm* — Joseph Kolodka

(57) ABSTRACT

Aspects of the present disclosure describe systems, methods and structures that perform linear-grammetry and calibration by simultaneous multilateration using only edge distance estimates via two-way ranging.

18 Claims, 2 Drawing Sheets

LINEAR-GRAMMETRY AND CALIBRATION BY SIMULTANEOUS MULTILATERATION USING ONLY EDGE DISTANCE ESTIMATES THROUGH TWO-WAY RANGING

CROSS REFERENCE

This disclosure claims the benefit of U.S. Provisional Patent Application Ser. No. 62/903,015 filed Sep. 20, 2019 the entire contents of which is incorporated by reference as if set forth at length herein.

TECHNICAL FIELD

This disclosure relates generally to multilateral object location. More particularly, it describes linear-grammetry and calibration by simultaneous multilateration using only edge distance estimates through two-way ranging.

BACKGROUND

The explosion of digital imaging and its utility for terrestrial mapping—among other uses—has provided societal benefits too numerous to list. From two dimensional photographs, three dimensional coordinates of objects may be determined and used. Given such importance, improved methods and techniques for object location and positioning would represent a welcome addition to the art.

SUMMARY

An advance in the art is made according to aspects of the present disclosure directed to systems, methods, and structures that perform linear-grammetry and calibration by simultaneous multilateration using only edge distance estimates via two-way ranging.

In sharp contrast to the prior art, systems, methods, and structures according to aspects of the present disclosure introduce a novel methods that advantageously locates objects in multi-dimensional space(s) using one dimensional distance measurement/estimates between pairs of objects.

Viewed from one aspect, the present disclosure describes a computer implemented method for relatively locating a plurality of objects in a space having a plurality of dimensions, using one-dimensional distance estimates between selected pairs of objects, said method comprising: by the computer: identifying a set of objects (clique) for which a distance estimate between pairs of individual objects in the set is known; relatively localizing the objects within the clique by their respective coordinates; unifying the coordinate systems among the clique; and outputting an indicia of the locations of the objects.

BRIEF DESCRIPTION OF THE DRAWING

A more complete understanding of the present disclosure may be realized by reference to the accompanying drawing in which.

Figure 1:
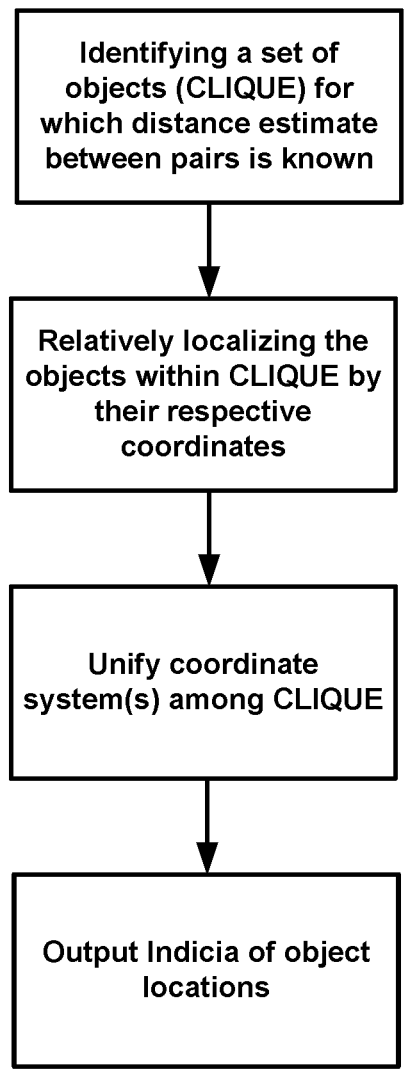
FIG. 1 is a flow diagram illustrating an illustrative method according to aspects of the present disclosure.
Figure 2:
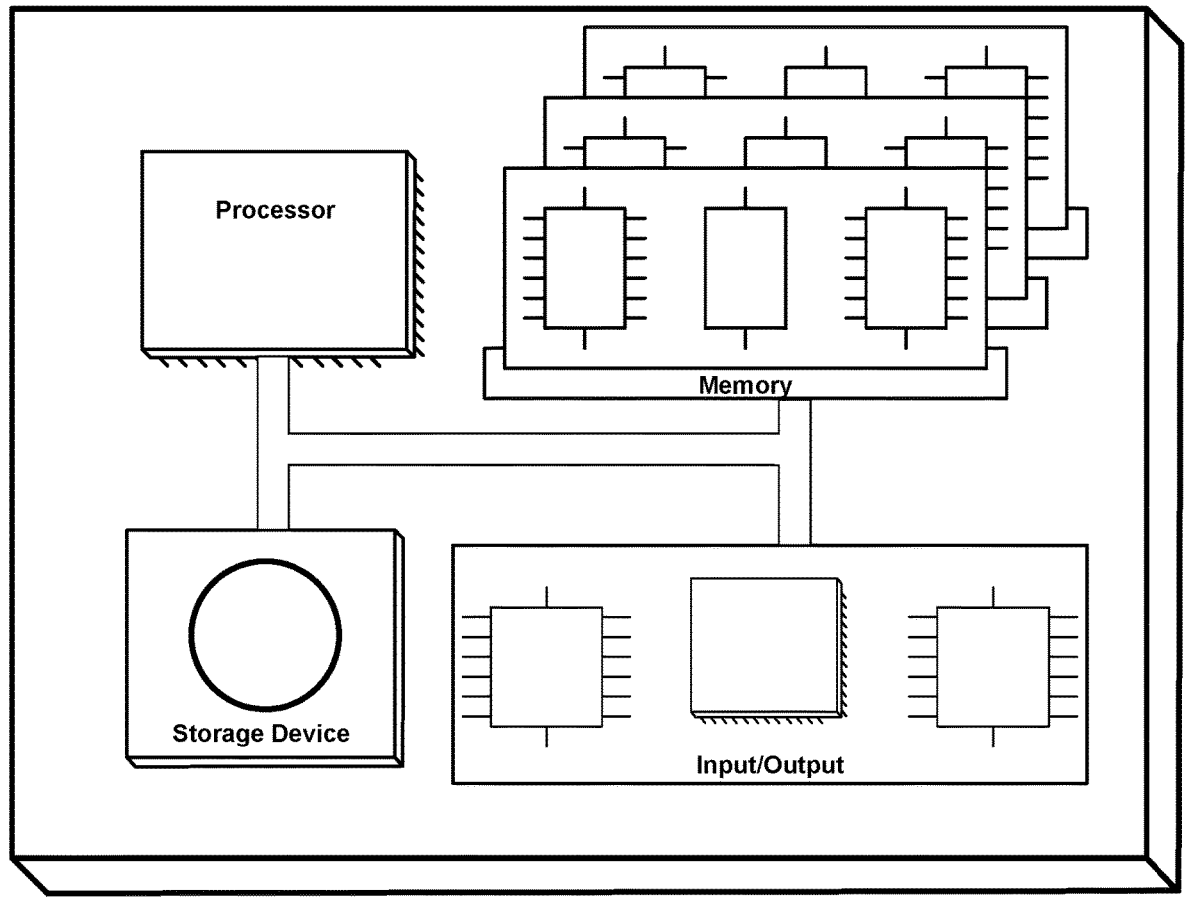
FIG. 2 is a schematic block diagram of an illustrative computer system known in the art that may be employed to practice the present invention.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGURES comprising the drawing are not drawn to scale.

INTRODUCTION

By way of some additional background, we note that multilateration is used to find an approximate location of an object (or a tag) by using distance measurement from the object to a set of known positions. The set of known positions are usually called anchor points and assumed to be stationary, although it is possible to use non-stationary anchor points if their movement parameters are known.

The accuracy of a multilateration algorithm generally depends on the accuracy of the distance measurement as well as the accuracy of the known location(s). Interestingly, not only does the measurement precision affect the accuracy of a multilateration algorithm, the absolute location of the anchor point does also. Hence, a planning phase is required to place anchor points in their best locations.

One of the initial problems encountered in multilateration algorithm(s) is the necessity to know the positions of the anchor points. This information may be obtained by a physical measurement of a position of each anchor point with respect to an origin and given coordinate system, i.e., Cartesian coordinate. However, such physical measurement is difficult—particularly when the number of anchor points increases or when one or more anchor point(s) need(s) to be relocated. In recognition of such, we advantageously describe herein a calibration mechanism in which a two way ranging between anchors is employed in order to find their locations in a given coordinate system.

Operationally, a calibration algorithm determines an exact position of the anchor points (up to the measurement error). As a result, such calibration may be used to infer a shape of an object as well as placement of the anchors.

Generally, the anchors have to "cover" all corner points of a given multi-corner shape. Note that as used herein—a multi-corner shape is any shape (convex or non-convex) which may be defined by a finite set of faces where the intersection of each three face defines a corner point and intersection of each two face defines an edge. A multi-corner object is in fact a polytope with finite number of surfaces. The output of the calibration algorithm in fact provides the shape of such multi-corner region of interest.

Photo-grammetry is known in the art as a means to find coordinates in three dimensional space based on the two dimensional photographs (photos) that are taken from different angles. In photo-grammetry, each photo provides a two dimensional projection of a three dimensional shape onto a plane. Hence, measurements on the plane not only provide an estimated value for distances between points, it also provides direction information in a two dimensional space as well.

In the calibration process noted previously, the three dimensional (or two dimensional) shape and estimate of coordinates is obtained using only one dimensional measurements that provides only an estimate of the distance between each two points—without any direction information—even in the one dimensional space. Hence, as used herein, the term linear-grammetry indicates—similar to the problem posed by photo grammetry—we are inferring a three dimensional (or two dimensional) shape and finding the coordinates of the vertices of the shape by using distance measurement on one dimensional spaces.

We note further that to maintain connectivity and possibility of two way ranging between nodes, additional anchor points may be required. For example, if two nodes are far apart and two way ranging between them is not possible, it may be required to place extra anchor points to maintain the possibility of two way ranging.

Although two way ranging between every mutual anchor point is desirable, it is not necessary. Nonetheless, it is better to maintain connectivity between every adjacent pair of points.

One interesting scenario introduces helper anchor points that are not deployed until after the calibration phase—during normal or usual operation of multilateration—where the position of an object (or a tag) is found by using two way ranging between the tag and the anchor points. The helper anchor points are used to impose more constraint on the system of the original anchor points where two way ranging between all original and helper anchor points are to be considered for finding the location of the original anchor points.

Since the calibrations process provides the shape, i.e., the coordinate of the polytope defined by the anchor points as its vertices, other measurements becomes possible. Such measurement includes finding the distance between two anchor points that was not known and/or determined in the two way ranging phase, e.g., because the two nodes were out of reach from each other. Another example of such measurement is finding the area of a given face of a multi-corner shape or an area of a shape defined by any set of corner points that lie on the same plane. Yet another example involves finding the volume of a multi-corner shape that is defined by any subset of the anchor nodes whether as a convex or non-convex region.

Simultaneous Multilateration

Consider a collection of observations of an estimated distance between N+1 locations $P_0, P_1, \ldots, P_N$. Let $r_0, r_1 \ldots, r_N$ represent the estimated location of the observation points $P_0, P_1, \ldots, P_N$, and $d_{ij}$ represents the estimated distance between two points $P_i$ and $P_j$. We take the point $P_0$ at the location $r_0$ to be the origin. Note that $d_{ij}$ may be the estimated time instead of the estimated distance as well since the estimated distance is just a linear function of the estimated time and therefore we can address an arbitrary linear combination of $d_{ij}$'s as well.

Let $r_1, \ldots, r_N$ represent the distance of the points $r_1, \ldots, r_N$ to the origin point $r_0$, i.e., $r_i = |r_i - r_0| = d_{i0}$.

We would like to find the coordinates of the anchor points $P_0, P_1, \ldots, P_N$ such that for any i and j we have:

$$d_{ij}^2 \approx (x_i - x_j)^2 + (y_i - y_j)^2 + (z_i - z_j)^2 = |r_i - r_2|^2 \quad [1]$$

where $r_i$ is a column vector $r_i = [x_i; y_i; z_i]$.

This set of approximate equations have to be satisfied simultaneously for an estimated locations $r_0, r_1, \ldots, r_N$, hence this is called simultaneous multilateration. We note that simultaneous refers to the inherent property of the problem at hand in which no prior knowledge of a location of any anchor (absolute or relative) is available in advance. However, the algorithm which finds such coordinates may still be sequential or parallel in nature. In ordinary multilateration, a location of a single point, say $r_i$ is unknown and the set of estimated distances $d_{ij}$ for some j's are available for which the corresponding approximate equation is considered simultaneously to find the best estimate of $r_i$.

In the following we describe two solutions for simultaneous multilateration—according to aspects of the present disclosure. Please note that a conventional or ordinary multilateration may be performed using the same algorithms proposed below. The reason is that in such cases, all the mutual distances between the known locations $r_j$ and $r_k$ may be directly calculated as $d_{jk} = |r_j - r_k|^2$ and substituted into the algorithm.

We also note that when all mutual distance estimates between every two points $r_i$ and $r_j$ are available, the rank deficient matrix approximation technique can directly find the coordinate of all anchor points in parallel. However, if only a subset of such estimations for some subset of the (i,j) pairs are available, then the rank deficient matrix approximation can be applied only to any subset of the nodes for which all the mutual distance estimates are available. In the next section, we describe a second technique—according to the present disclosure—which is an alternative approach based on recursive triangular reconstruction that can be applied for the cases that only a subset of distance estimates are available.

Generally, a rank deficient matrix approximation provides a better estimate with lower estimation error specially for a large number of nodes since it considers all constraints homogeneously. However, the recursive triangular reconstruction technique can be performed for different orders of picking such triangles and hence the estimation error depends on such selections. Of course, one can always try different selection orders and finally pick a solution that has a minimum mean square error. Nonetheless, even for a given order, recursive triangular reconstruction may provide a better solution in terms of the mean square error as compared to the rank deficient decomposition technique—particularly when the number of anchor nodes is small (say in the order of 10 nodes).

Let the subset of the pairs (i,j) for which the distance estimate $d_{ij}$ is available is denoted by S. We note that the meaning of simultaneously satisfying the approximate equation (1) may be interpreted as:

$$\min \sum_{(i,j) \in S} (d_{ij}^2 - |r_i - r_j|^2)^2 \quad [2]$$

where the minimization is taken over the locations $r_i$ of the anchor nodes $P_i$. Nonetheless other interpretations may be possible, say $$\min \sum_{(i,j) \in S} (d_{ij} - |r_i - r_j|)^2 \text{ or} \qquad [3]$$

$$\min \sum_{(i,j) \in S} |d_{ij} - |r_i - r_j||. \qquad [4]$$

Rank Deficient Matrix Approximation Technique

In order to write the problem in such a way that the solution can be obtained through the process of rank deficient matrix approximation, we employ a loosely posed problem definition where we try to simultaneously minimize the set of approximate equations:

$$d_{ij}^2 \approx (x_i - x_j)^2 + (y_i - y_j)^2 + (z_i - z_j)^2 = |r_i - r_2|^2 \qquad [5]$$

for all pairs (i,j), $0 < i,j < N$. We have:

$$2(x_i x_j + y_i y_j + z_i z_j) \approx (x_i^2 + y_i^2 + z_i^2) + (x_j^2 + y_j^2 + z_j^2) - d_{ij}^2 \qquad [6]$$

$$2 r_i^T r_j \approx |r_i|^2 + |r_j|^2 - d_{ij}^2 \qquad [7]$$

By collecting all location vectors (in the form of a row vector $r_i^T$) into the column of a matrix $R^T$ we have:

$$R^T R = \begin{bmatrix} r_1^T \\ r_2^T \\ \vdots \\ r_N^T \end{bmatrix} [r_1 \quad r_2 \quad \ldots \quad r_N] \approx Q \text{ where} \qquad [8]$$

$$Q = \qquad [9]$$

$$\frac{1}{2} \begin{bmatrix} |r_1|^2 + |r_1|^2 - d_{11}^2, & |r_1|^2 + |r_2|^2 - d_{12}^2, & \ldots & |r_1|^2 + |r_N|^2 - d_{1N}^2 \\ |r_2|^2 + |r_1|^2 - d_{21}^2, & |r_2|^2 + |r_2|^2 - d_{22}^2, & \ldots & |r_2|^2 + |r_N|^2 - d_{2N}^2 \\ & & \vdots & \\ |r_N|^2 + |r_1|^2 - d_{N1}^2, & |r_N|^2 + |r_2|^2 - d_{N2}^2, & \ldots & |r_N|^2 + |r_N|^2 - d_{NN}^2 \end{bmatrix}$$

We note that the approximation objective [7] may be written for any set of points where all mutual links have a distance estimate available. Hence, if we represent anchor nodes by a node of a graph and the edge of the graph—where the distance estimation is available—for any clique of this graph the approximation objective [7] is valid.

Note that the approximation objective [7] may be solved by considering as fact that the rank of matrix R is 3 (almost surely). If matrix Q is obtained with no noise in measurement, it will turn out that this matrix is also of rank 3. However, in the presence of noise in the measurement, the rank of matrix Q is more than 3 and is usually close to full rank. This means that if, e.g., 200 nodes are considered the rank of matrix Q is close to 200, e.g., 197. Hence, the solution to the approximation objective [7] is the best rank deficient approximation of matrix Q of rank 3.

The solution to such rank deficient approximation problem may be obtained through Eckart-Young-Mirsky theorem by using truncated singular value decomposition up to the degree 3 and generating:

$$R^T R = U_1 D_1 V_1^H \text{ where} \qquad [10]$$

$$Q = UDV^H, \qquad [11]$$

$$U = [U_1 \quad U_2], \qquad [12]$$

$$V = [V_1 \quad V_2], \text{ and} \qquad [13]$$

$$D = \begin{bmatrix} D_1 & 0 \\ 0 & D_2 \end{bmatrix}. \qquad [14]$$

Please note that the condition on rank 3 is due to the fact that anchors are assumed to be in three dimensional space. If in fact the anchors lie on a plane, the rank would be 2 and if they are only placed on a line then the rank would be one.

The rank deficient matrix approximation can directly be used to localize and calibrate the positions of all the anchors if all mutual distances between every pair of anchor points is available. However, in large areas where some anchors may not be read by other anchors, not all the distance estimates are available. In such cases the rank deficient matrix approximation technique is useful only on the cliques of the connectivity graph between the anchors.

Since the rank deficient matrix approximation technique provides the position of the anchors for all the nodes of a clique in an arbitrary coordinate systems, such solutions for different cliques may be found in different coordinate systems (it almost surely happens). We will discuss the possibility of merging all such localizations into the same coordinate system. In three dimensional systems such unified coordinate systems is available only if there is at least four common points between each two cliques. The reason is that a unique coordinate systems is only defined in n dimensions if it contains a clique of size n+1.

We note that inherently the solution to the simultaneous set of approximation objectives [7] has an ambiguity in the origin and the orientation of the coordinate system. These two ambiguities may be easily resolved by fixing an origin, e.g., to be one of the anchor positions and an orientation of a given vector in three dimensional space, e.g., the orientation of the x axis. This orientation for example can be taken to be the vector from the origin to a second anchor point. Then the orientation of another vector, say the y axis can be found by using the location of the third anchor which is not on the same line as the first two anchors. consequently, the orientation of the z axis will be fixed and determined. However, since the approximation objectives [7] are all quadratic (they will be defined in terms of the absolute distance without indicating the direction of such edge between the two anchors) then there will be a need to assume the direction of the projection of the fourth anchor points (that does not lie in the plane of the previous three anchor points) in order to define the position of the fourth point. This means that the fourth point can have an arbitrary positive or negative sign for its projection into the z axis. Hence, the fourth point completely determines the coordinate system.

It is important to note that any solution to the set of approximation objectives [7] has the third ambiguity which relates to the direction of the last coordinate axis, say z axis. This ambiguity is not possible to resolve and the final solution would be one of the two solutions where these two solutions are the reflection of each other with respect to the origin. Although, unlike the first two ambiguity (the origin and orientation of the coordinate system up to a rotation) are resolvable, the third ambiguity (the reflection) is not possible to resolve, however in the process of the combining multiple coordinate systems that have at least four common anchor points (that do not lie on the same plane) this ambiguity is not harmful. This means that the final common coordinate will still be one of two possible coordinate systems where one is the reflection of the other one with respect to the origin.

A modified version of the rank deficient matrix approximation technique relies directly on eigenvalue decomposition. Since the matrix Q is symmetric, we can find the eigenvalue decomposition of the Q as $$Q = UDU^H. \qquad [15]$$

in such a way that the elements of the diagonal matrix of eigenvalues D are in descending order. The eigenvalues of a matrix with all real entries may be complex values but will appear in a conjugate pairs. In such cases, one can place the complex values at the end of the list when soring the eigenvalues in descending order. Alternatively, we can simply use the singular value decomposition technique discussed above. We can generate the rank deficient matrix approximation as before by defining $$R^T R = U_1 D_1 U_1^H \text{ where} \quad [16]$$

$$U = [U_1 \ U_2], \text{ and} \quad [17]$$

$$D = \begin{bmatrix} D_1 & 0 \\ 0 & D_2 \end{bmatrix}. \quad [18]$$

where $D_1$ is of dimension nbyn if we seek a solution inn dimensional space.

Recursive Triangular Reconstruction Technique

We now describe our general technique that can be applied where the set of mutual distance between the anchor nodes is only partially known. In such cases, the technique of rank deficient matrix approximation can only be applied to a subset of the node for which the distance between every pair of the anchor nodes is known. This subset of the nodes can be interpreted as a clique in the connectivity graph where the connectivity graph is defined as the set of nodes corresponding to the set of anchor nodes and edges between two nodes if the distance estimates between the corresponding anchor nodes is known. The weight of the corresponding edge is equal to the estimated distance.

It can be seen that the rank deficient matrix approximation becomes more precise as the size of the clique increases. However, for small size cliques the proposed algorithm in this section (recursive triangular reconstruction technique) is faster and more effective.

Consider a 4-clique that is a clique of size 4 where the 4 anchors are not on the same plane. The algorithm finds the relative location of these 4 nodes in a coordinate system as follows. We note that this solution is unique up to a reflection. This means that only one of the two solution are happening in reality. Of course, the shapes and the points in this coordinate system can then be shifted and rotated to fit any other coordinate systems.

The algorithm starts by considering the first point (A) as origin. The second point is then assumed to be on one of the axis, for example the x-axis. The distance between the first and the second node (B) uniquely determines the position of the second node up to a sign. We assume a positive sign for the second node on the x-axis. The third point (C) and the x-axis define a plane. We find the perimeter of the triangle ABC by using the Heron's formula based on its sides which is known as the estimated distance between each two vertices of this triangle. These would be equal to one half of the height of the node C from the side AB. This means that the y coordinate of the node C can be easily found up to a sign. We assume positive sign for the y-coordinate of the node C. The x-coordinate of the node C up to a sign is easily calculated based on its distance to origin and the y-coordinate of the node C. Finally, the sign of the x-coordinate of the node C is resolved by considering its distance to the second node, i.e., node B.

The fourth point (D) is assumed to be not in the same plane as the first three points. Hence, the fourth point is used to uniquely define the coordinate system. Similar to the steps taken to find the y-coordinate and x-coordinate of the node C, one can find the x-coordinate and y-coordinate for the point D in the plane of ABD.

It turns out that the x-coordinate in the plane defined by ABC and ABD are the same hence the x-coordinate of the node D including its sign is uniquely defined. However, the y-coordinate needs more elaborate calculation.

We note that a full three dimensional coordinate system is defined by a three points that are not in the same plane, say by the vertices of the triangle ABC or simply by the triangle ABC. This can be viewed as follows: the origin is defined by one node the x coordinate and its direction is assumed by the second node and the y-axis and its direction is obtained by the third point. Hence, the z-axis is uniquely determined as well. However, in the coordinate system defined by triangle ABC there is still one possible confusion about the direction of the z coordinate of any points that does not lie in the plane of the triangle ABC. To resolve the ambiguity, the fourth point is required to assume the direction of the z axis.

We note that although this assumption resolves the ambiguity and allows unifying the coordinate systems between different point, however, the physical placement of the nodes might in fact be the reflection of the points in the coordinate system. This is an inherent ambiguity that is not physically resolvable unless if it is matched to the actual physical points. This is the main reason that one of the two possible solution is always possible where one is the reflection of the other. An interpretation of this phenomenon is that the direction of the z-axis is by definition found by the right hand rule. This could very well be defined by the left hand rule which result in a reflected coordinate system.

In order to find the y-coordinate of the point D in the coordinate system defined by triangle ABC, we use the following two equations:

$$(x_D - x_C)^2 + (y_D - y_C)^2 + (z_D - z_C)^2 = d_{CD}^2 \quad [19]$$

and $$x_D^2 + y_D^2 + z_D^2 = d_{AD}^2 \quad [20]$$

where $x_D, x_C, y_D, y_C, z_D, z_C$ are in the coordinate system defined by triangle ABC. We note that $x_D, x_C$ are found in the same coordinate system as we discussed previously. The value of $y_C$ is also known and $z_C$ is in fact zero.

By expanding $(y_D - y_C)^2 + (z_D - z_C)^2$ in (19) and replacing $y_D^2 + z_D^2$ from (20) we have:

$$y_D = \frac{(x_D - x_C)^2 + y_C^2 + d_{AD}^2 - x_D^2 - d_{CD}^2}{2 y_C}. \quad [21]$$

Finally, the value of $z_D$ is found by using [20]. While the sign of $y_D$ is uniquely defined based on the coordinate systems defined using triangle ABC, the sign of $z_D$ has to be assumed, e.g., to be positive.

The coordinate of any other nodes, say node E, for which its distance to all four nodes A, B, C, D is known can be found easily by using the same procedure discussed for the fourth point, i.e., the point D. However, at the last step the decision on the sign of the $z_E$ is performed by using $d^2_{DE}$ since one of the two choices $z_E$ or $-z_E$ would have better approximation of the distance between the two nodes D and E, i.e., pick arbitrary sign for $z_E$, if $f(-z_E) < f(z_E)$ then $z_E = -z_E$ where $$f(z_E) = |(x_D - x_E)^2 + (y_D - y_E)^2 + (z_D - z_E)^2 - d_{DE}^2|. \quad [22]$$

Coordinate Unification

During the process of identifying the shape or the localization of the nodes of a multi-corner shape, we use cliques of the connectivity graph and solve for the shape of each clique in their respective coordinate systems. This step generates different pieces of the shape. Coordinate unification is the process of putting these pieces together in order to generate the whole shape. Unification of the coordinates require recursively combining at least two coordinate systems at a time.

Based on the previous discussions, unifying two n-dimensional coordinate systems is possible if they have at least n+1 common nodes. These common nodes determine a unique coordinate system, hence, there exist a unique common coordinate systems where both of these coordinate systems can be expressed in that coordinate system. We note that if both coordinate systems have common origin, they have to be related through a linear transformation which possibly includes, rotations and reflection, and scaling.

Let $A_0, \ldots, A_n$ be the common nodes in both coordinate systems. First we translate both coordinate system such that $A_0$ corresponds to the origin (all zero vector). Then we express the n column vectors representing $A_1, \ldots, A_n$ in the first and second coordinate systems by $u_1, \ldots, u_n$ and $v_1, \ldots, v_n$, respectively. As such, we have:

$$\begin{bmatrix} T_{11} & T_{12} & \ldots & T_{1n} \\ \vdots & & & \\ T_{n1} & T_{n2} & \ldots & T_{nn} \end{bmatrix} [u_1 \ u_2 \ \ldots \ u_n] = [v_1 \ v_2 \ \ldots \ v_n] \quad [23]$$

where $$= \begin{bmatrix} T_{11} & T_{12} & \ldots & T_{1n} \\ \vdots & & & \\ T_{n1} & T_{n2} & \ldots & T_{nn} \end{bmatrix} \quad [24]$$

is the transformation matrix which can transform any vector u in the first coordinate system to its corresponding vector v=u in the second coordinate system. An interesting observation is that at each step of this recursive algorithm we only need two clique to have n+1 common nodes. For example, consider the case that there are only three cliques defined by the following set of nodes $$S_1 = \{A_0, A_1, A_2, A_3, B_0, B_1, C_0, \ldots, C_k\} \quad [25]$$

$$S_2 = \{A_0, A_1, A_2, A_3, B_2, B_3, D_0, \ldots, D_l\} \quad [26]$$

$$S_3 = \{B_0, B_1, B_2, B_3, E_0, \ldots, E_m\} \quad [27]$$

for some arbitrary values of k,l,m. We note that only the clique $S_1$ and $S_2$ have four common points, hence their coordinate system can be unified where $S_1 \cup S_2$ is now defined. Hence the algorithm can go on by considering two coordinate systems for $S_1 \cup S_2$ and $S_3$ as they have four common points $\{B_0, B_1, B_2, B_3\}$.

Anchor Positions

As discussed earlier, not only the accuracy in the localization of the anchor points, but also the actual location of them affects the accuracy of the system in localizing the objects through two way ranging between the object and a subset of anchor points. The same concept in true in the initial step where the location of all anchor points or any subset of them is not known. Hence, in finding the location of the anchor points, the relative distance between pairs of anchor points are used in finding their absolute position with respect to a coordinate system.

In particular, our algorithms would achieve lower mean localization error if the approximate or relative location of the anchor points follow certain guidelines. For example, in order to be able to have a unified coordinate system, one need to place the anchor points such that the cliques have certain overlap. This overlap itself would be a clique and the size of this clique has to be larger than the dimension of the space. This means to have a unified coordinate system in three dimensions, we need to have an overlap of 4 anchor points at least between two cliques.

Although it is not necessary that every two cliques have a common clique with size larger than the dimension of the space, but this would be a good idea to satisfy this condition between each mutual cliques of the original connectivity graph. In fact, the accuracy of any algorithm in finding the location of anchor points within a clique would increase as the size of the clique increases. Hence, having an initial clique with enough degree between each pairs of the initial maximal cliques could eventually result in a common clique of a larger size.

We note that in covering a large space, some anchor points would not be "heard" by the other anchor points. However the anchor points should be placed such that (1) the connectivity graph between the anchor points is a single connected graph; (2) the size of the maximal cliques in the connectivity graph is larger than a threshold to achieve sufficiently good localization within each clique; (3) there is a common clique larger of a size larger than a threshold (at least larger than the dimension of the space) between at least two initial maximal cliques (and it is better to have this condition satisfied for every pair of the maximal cliques.

Considering the conditions for the good placement of anchor points, we note that these conditions are primarily necessary in the calibration step where the absolute (within the possible localization accuracy) location of the anchor points in given coordinate systems are found. However, once the coordinates are known, the accuracy of the localization may not depend on the aforementioned conditions on the cliques. Therefore, one can consider auxiliary or helper anchor points that are added solely for the purpose of satisfying the conditions on connectivity, size of the common cliques between a pair of maximal cliques, and size of the maximal cliques in order to achieve high accuracy in finding the location of the anchor points.

The helper anchor points may be removed later once the calibration process is performed. An exemplary use case is where the location of the helper points are not appropriate for the permanent placement of the anchors while such locations would greatly help in satisfying for example the maximal clique size, or to make a graph connected.

Use Cases

We now briefly consider different use case scenarios. First, we consider a case where the connectivity graph for all the nodes is in fact a single clique. In this case, one can use the matrix approximation technique to localize the anchor points in a given coordinate system. The coordinate system can then be shifted, rotated, and reflected to match a certain orientation and placement. Such orientation may be considered with respect to the actual physical space in which the anchors are placed, or could be defined with respect to a subset of anchor points, say by assuming an anchor point to be the origin, or to lie on a particular axis, direction or plane.

A second use case scenario can be considered as having a placement for anchors where their connectivity graph is not a clique. This means that there would be a set of maximal clique where a maximal clique is defined as a clique which cannot be appended by any other anchor points to generate a larger clique. In such cases, the matrix approximation technique can be applied to any clique to find the anchor locations in a coordinate system. The coordinate systems can then be unified recursively if at any step there are at least two cliques which have a common clique of size greater than the dimension of the space.

We note that one can add additional anchor points to increase the accuracy of localization for any clique or to satisfy the conditions on the size of the common clique between two cliques in the coordinate unification algorithm.

In a third use case scenario, one can have a set of anchor points that are not part of a fully connected connectivity graph. For example, suppose we are interested in finding the volume of a large warehouse. It might be sufficient to consider just a few corner points to fully define the shape of the warehouse. However, this may result in a disconnected connectivity graph. By adding nodes, one can make the graph connected. However, it might still not be sufficient to be able to find the coordinate of all the anchor points in a unified coordinate system. Hence, more anchor points would need to be added to satisfy the conditions on the maximal cliques (in order to find a solution in a unified coordinate system) leaving aside the accuracy of the localization in each maximal clique.

The recursive triangular reconstruction technique (RTRT or RT2) can be applied irrespective of the scenarios discussed above. In RT2, we start with a set of anchor with unknown position and sequentially add a next point to the set of anchors with known positions. Besides the first n+1 nodes (where the dimension of the space is n), one would add the next point, say P, as a point that has at least distance measurement to n+1 nodes that are in the set of anchors with known positions. These n+1 nodes are called a basis for the point P and the basis is not necessarily unique. We note that depending on which basis is selected, the coordinate system may need to be adjusted at each step In other word the coordinate of the point P will be found in a coordinate defined by the chosen basis and hence this coordinate may need to be translated to another coordinate for example if the coordinate of all the points in the set of known positions are defined by a different basis.

At this point, while we have presented this disclosure using some specific examples, those skilled in the art will recognize that our teachings are not so limited. Accordingly, this disclosure should only be limited by the scope of the claims attached hereto.

The invention claimed is:

1. A computer implemented method for relatively locating a plurality of objects in a space having a plurality of dimensions, using one-dimensional distance estimates between selected pairs of objects, said method comprising:
   by the computer:
   identifying a set of objects (clique) for which a distance estimate between pairs of individual objects in the set is known;
   relatively localizing the objects within the clique by their respective coordinates;
   unifying the coordinate systems among the clique;
   wherein the unifying coordinate system between two cliques comprises finding two cliques that have a common clique of size equal to the dimension of the space plus one;
   wherein unifying the coordinate system between cliques performed successively by initializing every clique to be a union clique and generate a set of all union cliques;
   unifying the coordinate system between two union cliques to generate a combined union clique with a unified coordinate system;
   replacing the two union cliques with their combined union clique in the set of all union cliques; and
   outputting an indicia of the locations of the objects.

2. The method of claim 1 wherein the cliques are maximal cliques wherein no more objects can be added to the clique to generate a new clique.

3. The method of claim 1, wherein the set of objects comprises of a set of anchors and the relative localization is first performed on the set of anchor points to form a union cliques between the anchor points.

4. The method of claim 3, wherein at least one anchor is placed in particular locations in a planning phase.

5. The method of claim 3, wherein the anchors are placed such that an intersection of at least two subset of anchor points that form a clique with respect to the distance measurements contain at least n+1 anchors where n is the dimension of the space.

6. The method of claim 3, wherein an auxiliary anchor is dynamically added to the set of anchors.

7. The method of claim 6, wherein the auxiliary anchor satisfies connectivity of a graph comprising the anchors as nodes and edges where measurement is available between two anchors.

8. The method of claim 6, wherein the auxiliary anchor is added such that the size of a clique is increased.

9. The method of claim 6, further comprising adding at least an auxiliary anchor only during calibration and removing that added anchor after calibration.

10. The method of claim 1, further comprising filtering measurements of relative localization of objects in a clique and unification of relatively localized cliques.

11. The method of claim 1, further comprising scheduling measurement between a pair of objects.

12. The method of claim 1, wherein the unifying the size of the clique comprises choosing a clique that includes at least n+1 objects such that they are not in a same hyperplane having a dimension one less than that of its ambient space of dimension n.

13. The method of claim 12, wherein a chosen clique is one that contains at least 3 objects that are not in a same line in 2-dimensional space or one that contains at least 4 objects that are not in a same plane in 3-dimensional space.

14. The method of claim 1, further comprising placing objects at corners of a polytope such that a measurement associated with the polytope includes an area of a face of a polytope, or volume of a polytope.

15. The method of claim 1, further comprising relatively localizing a subset of objects using rank deficient matrix approximation wherein the rank is less than or equal to the dimension of the space.

16. The method of claim 15, further comprising identifying a maximal clique and relatively localizing objects in the maximal clique, from the remaining objects finding an object with maximal number of distance measurement to the localized objects and relatively localize this object in the same coordinate system, and continue the process of relatively localizing the remaining unlocalized objects one by one.

17. The method of claim 1, wherein the unification between two union cliques further comprises selecting two union cliques with maximal number of distance measurements between the objects from the two union cliques.

18. The method of claim 1, further comprising unifying the coordinates by selecting the union cliques with different orders and finally selecting the one with lowest mean squared error.

* * * * *